United States Patent [19]

Anderson et al.

[11] 4,043,403

[45] Aug. 23, 1977

[54] AGRICULTURAL IMPLEMENT FRAME ELEVATING MECHANISM

[75] Inventors: Carl M. Anderson; Charles W. Anderson, both of Kewanee, Ill.

[73] Assignee: Chromalloy American Corporation, St. Louis, Mo.

[21] Appl. No.: 669,485

[22] Filed: Mar. 23, 1976

[51] Int. Cl.² ............................................. A01B 65/06
[52] U.S. Cl. .................................. 172/413; 280/43.23
[58] Field of Search ........................ 172/413, 668, 407; 280/43.23, 43.2

[56] References Cited

U.S. PATENT DOCUMENTS

| | | | |
|---|---|---|---|
| 2,840,971 | 7/1958 | Greeson | 172/413 X |
| 2,938,588 | 5/1960 | Stein | 172/413 X |
| 3,228,727 | 1/1966 | Paulson | 280/43.23 |
| 3,627,157 | 12/1971 | Blatchly | 280/43.23 |
| 3,648,780 | 3/1972 | Fueslein | 172/413 X |

Primary Examiner—Richard J. Johnson
Attorney, Agent, or Firm—Johnson, Dienner, Emrich & Wagner

[57] ABSTRACT

The supporting transport (or depth gauge) wheels of an agricultural implement are raised and lowered by means of a hydraulic-actuated piston cylinder which pivotally connects to one end of a bell crank lever made rigid with a pivot shaft rotatably journalled to the implement frame and to which shaft the wheel supports are also rigid. The opposite end of the piston cylinder pivotally connects to a cradle which has its near end pivotally connected to the other end of the bell crank lever and its remote end yieldably connected to the implement frame as by a pin and slot connection (or a pivoted link) which accomodates horizontal movement with little or no vertical displacement of said remote end in response to extension and retraction of the piston cylinder.

11 Claims, 5 Drawing Figures

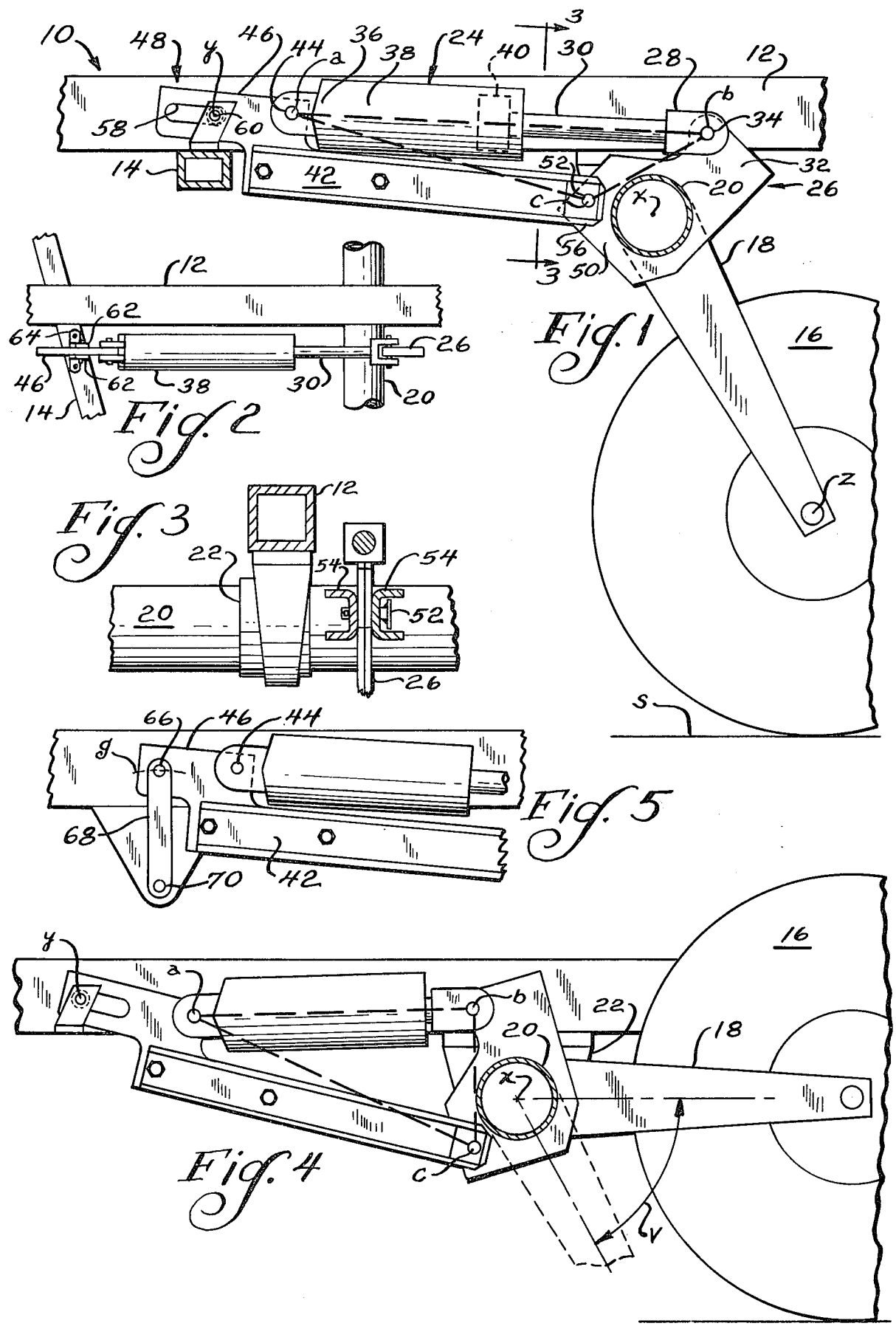

AGRICULTURAL IMPLEMENT FRAME ELEVATING MECHANISM

This invention relates generally to agricultural implements which are used in soil tillage and particularly to an improved mechanism for raising and lowering the transport and/or tillage depth gauging wheels with which such implements are conventionally supplied.

Commonly, the opposed ends of a hydraulic piston cylinder, ratchet jack, turn screw or other actuating member used to raise and lower the implement wheels are connected directly to the implement frame and to an actuating arm or lever rigid with the rotatably journalled rock shaft with which the wheel support is also rigidly connected. In such a system the implement frame and the actuated rock shaft mechanism are subjected to severe bending forces and strain in the normal operation of the actuating member.

A principal object of this invention is to provide improved means for mounting the actuating member which will reduce or effectively cancel out said bending forces to which the implement frame is subjected in the act of raising and lowering the wheels under the resisting load of the implement.

In accordance with this invention, the actuating piston cylinder or other length-adjustable member is not connected directly to the implement frame, but through the intermediary of a cradle which is yieldably connected at one end to the implement frame. The actuating arm of the rock shaft mechanism is replaced by a bell-crank lever, the two radial arms of which are angularly displaced about the axis of the rock shaft and to opposite sides of the mounting of the wheel supports to said rock shaft. The yieldable connection of the cradle to the implement is so constructed that it will accommodate movement of the cradle generally lengthwise of the frame in response to retraction and extension of the piston cylinder or other length-adjustable actuating member but inhibits movement of the frame connected end of the cradle in directions transversely thereof.

In one disclosed embodiment of the invention, the yielding connection of the cradle to the implement frame embodies a pin and slot arrangement. In an alternate embodiment, a pivoting link disposed generally at right angles to the axis along which the piston extends and retracts is utilized to attach the cradle to the implement frame.

An important feature of the invention is that the means for operating the rock shaft of mechanism to raise and lower the wheels is a closed system. The reacting forces are contained by the cradle within the system and no large undesirable forces are imported to the implement frame or pivot shaft bearings. Actuation of the lengthadjustable member, for example extension and retraction of the piston within its cylinder, imparts primarily pure torque to the rock shaft and a greatly reduced bending load to the implement frame as compared to implements employing conventional means of mounting a hydraulic cylinder or like actuating member to the rock shaft.

Important features and advantages derived from the invention include the reduced requirements for strength in the pivot shaft mechanism, in the frame construction and in the pivot shaft bearings.

A further feature which flows from the invention is that the weight of the mechanism can be reduced and also its cost. There is also an improvement in the life of the parts affected by the wheel raising and lowering mechanism.

Thus the structure is one that is economical to manufacture and which also is efficient and effective in its operation.

Many other advantages and/or features of the invention will be apparent or will become so upon consideration of the preferred embodiments which now will be described in connection with the accompanying drawing.

Referring first to said drawing:

FIG. 1 is a fragmented side elevational view of a first embodiment of the invention and illustrates the implement with its wheels in their transport position;

FIG. 2 is a fragmented top plan view of the structure illustrated by FIG. 1;

FIG. 3 is a sectional view taken along lines 3—3 in FIG. 1 looking in the directions indicated by the arrows;

FIG. 4 is a view generally similar to FIG. 1 and illustrates the implement wheels moved to their raised position and the implement thereby lowered to its working position; and FIG. 5 illustrates an alternate arrangement for connecting the piston cylinder cradle to the implement frame.

Referring now more specifically to the several views wherein like parts are identified by like reference numerals, and first to FIGS. 1-3, the frame of an agricultural implement such as a field cultivator, disk, mulcher or the like is illustrated generally at 10. Frame 10 conventionally comprises spaced longitudinal beams one of which is illustrated at 12 and transverse beams one of which is illustrated at 14. Said longitudinal and cross beams are assembled and united as by weldments or bolts into a rigid structure, commonly of generally rectangular shape, and provide support for depending soil tillage tools not shown. Such a frame 10 is conventionally mounted on laterally spaced transport wheels 16, one of which is shown in FIG. 1 and means are also provided for rocking the wheels about a pivot shaft so as to raise and lower the wheels relative to said frame. Wheels 16 when lowered to their transport position as illustrated in FIG. 1 effectively raise the frame 10 and thereby its soil tillage tools out of engagement with the ground surface S as when the implement is to be moved from one location to the next. In the raised position of the wheels as illustrated by FIG. 4, the implement frame has been lowered to its working position in which position the tillage tools are located to engage and/or dig into the soil. By adjusting the related height of the wheels to the implement frame, the wheels may serve to gauge the tilling depth at which the tools are set.

As illustrated in FIG. 1, wheels 16 are rotatably supported on a wheel support or arm 18 rigid with pivot shaft 20. Pivot shaft 20 is illustrated in FIG. 3 as being rotatably journalled in one of several spaced bearing members 22 which are bolted, welded or otherwise made rigid to the underside of the longitudinal beams 12. It will be understood that pivot shaft 20 extends in a transverse horizontal direction and at right angles to the direction in which the implement is pulled, and ordinarily will have two or more wheel supports 18 fixed thereto at spaced intervals, each said supports 18 supporting one or more wheels 16.

In accordance with this invention, torque is applied to pivot shaft 20 by extension or retraction of a lengthadjustable member which effectively rocks arms 18 about axis $x$ of the pivot shaft 20 in the wheel raising and lowering act. In the illustrated embodiments of the invention, the lengthadjustable member is a double-acting hydraulic-actuated piston cylinder indicated generally at 24, and embodies a hydraulic cylinder 38 having a piston rod 30 reciprocally mounted in the cylinder for retraction and extension through one end thereof. However, it may also comprise a ratchet-operated jack, a turn screw or other member capable of being adjusted in length.

As the length of the piston cylinder member 24 is increased or decreased, its changing length applies torque to pivot shaft 20 through an actuating bell-crank lever 26 made rigid with said pivot shaft 20. As illustrated in FIG. 1, the clevis end 28 of piston rod 30 of member 24 is connected to the longer arm 32 of said bell-crank lever 26 as by a pivot pin 34. The remote end 36 of the hydraulic cylinder 38 of said member 24 is connected to the implement frame 10, not directly as is conventional, but through the intermediary of a cradle 42 to which it is pivotally connected as by a pivot pin 44. In accordance with this invention, remote end portion 46 of the cradle 42 is connected by a yielding connection 48 to the implement frame, the opposite or near end of the cradle being connected to the lower shorter arm 50 of the bell-crank lever 26 as by pivot pin 52. The pivotal connection 44 of member 24 to the cradle 42 is disposed intermediate said yielding connection 48 and its connection 52 to the actuating lever 32. Preferably end portion 46 of the cradle 42 to which hydraulic cylinder 38 pivotally connects is offset from the remaining length of the cradle such that its yieldable connection 48 lies generally behind the pivotal connection 44 of the length-adjustable member thereto, that is behind hydraulic cylinder 38 and on the axis of the reciprocal movement of rod 30 acting therein. The remaining major portion of the cradle is disposed generally horizontal and close to the hydraulic cylinder in the extended position of its piston rod 30.

Cradle 42 may be of any suitably strong rigid construction and in FIGS. 1 and 3 is illustrated as comprising a pair of longitudinal channeled members 54, the inner end portions 56 of which engage about and are connected to the bell-crank actuating lever 26 as by the aforementioned pivot pin 52. The opposite ends of said channel members 54 are bolted or otherwise fixed to the opposed sides of the end plate member 46 to which the remote end 36 of hydraulic cylinder 38 is pivotally mounted as aforesaid.

In accordance with the invention as illustrated in FIG. 1, remote end portion 46 of the cradle contains a narrow slot 58 which is elongated generally in the direction of the longitudinal axis of the cradle 42 and therefore generally horizontal when the length-adjustable member, hydraulic cylinder 24, is in its extended state and wheels 16 are lowered to their transport position (FIG. 1). Extending through said elongated slot 58 is a pivot pin 60 by which cradle end portion 46 is pivotally mounted between upstanding ears 62 of the mounting member 64. In FIGS. 1 and 2 mounting member 64 is illustrated as fixed by bolts to the top surface of an appropriately located one of the transverse members 14 comprising the implement frame. Alternatively, pivot pin 60 could be fixed to longitudinal beam 12 of the implement frame 10.

Considering now FIG. 4 with FIG. 1, member 24 comprises one leg $ab$ of a triangle $abc$, said leg being of variable length. The other two legs $ac$ and $cb$ of said triangle are of fixed or unchanging length. Considering the transport wheels 16 to be in their "down" position with the implement frame 10 raised, and member 24 in its extended condition as illustrated by FIG. 1, the implement wheels 16 may be raised to their FIG. 4 position to lower the implement frame by retracting the piston 30 within the hydraulic cylinder 38. In such action leg $ab$ representing the separation of pivot pin 34 from pivot pin 44 is effectively shortened. Conversely, considering the implement wheels 16 to be in their raised position as illustrated by FIG. 4 and the implement frame in its lowered working position, the implement may be raised to its transport position by extending piston rod 30 to increase the length of leg $ab$ to that illustrated by FIG. 1.

Thus, it will be seen that as the length of leg $ab$ changes with extension and retraction of the piston within the hydraulic cylinder of member 24 there is a corresponding displacement of pivot $c$ and change in angle $acb$. However, legs $ac$ and $cb$ of the triangle remain of constant length and the reacting forces exerted by the changing length of leg $ab$ (represented by member 24) between pivot pins 44 and 34 are contained within the closed system represented by triangle $abc$ and not transferred to pin 56 on bearing members 22 and the implement frame. This is because as leg $ab$ changes in length, the corresponding displacement of $c$ relocates pivot pin 60 in slot 58 so that the horizontal forces exerted at $a$ and $b$ are not transferred through pivot connection $y$ (pivot pin 60) to the implement frame. For this purpose slot 58 is elongated in a direction generally parallel to the axis $ab$ along which the hydraulic cylinder 24 or other lengthadjustable member extends and retracts and is also of a length sufficient to accommodate the displacement of pivot $c$ within the full stroke of the hydraulic cylinder. The width or height of slot 58, however, approximates the diameter of pin 60. That is, it exceeds the pin diameter only by an amount sufficient to provide clearance for unimpeded movement of the slot edges relative to the pin 60. Of consequence, change in the implement height off the ground surface $s$ is directly responsive to a change in the length of $ab$ and the resultant rocking of the wheel supporting arms 18 about axis $x—x$.

For the mechanical advantage gained, radial arm $bx$ represented by the spacing of pivot pin 34 from the axis of pivot shaft 20 exceeds radial arm $cx$ represented by the spacing of pivot pin 52 from said shaft axis. The relative length of radial arms $bs$ and $cx$ of the bell-crank lever 26, as well as their angular disposition on shaft 20 and from the axis $z$ of the wheel support 18 is determinative of the angle $v$ through which wheel arms 18 swing as the wheels move between their transport position (FIG. 1) and working position (FIG. 4), considering also the stroke of piston 40 and the related dimensions of the three legs of the aforesaid triangle $abc$.

Thus in one reduction of the invention to practice where angle $v$ was 63° and the stroke of the elected piston 10 inches, satisfactory results were obtained where leg $ab$ was variable in length between 30.25 and 20.25 inches, leg $bc$ having a fixed length of 9.5 inches and leg $ca$ a fixed length of about 22 inches. In this arrangement, radial arm $cx$ had a length of 4.75 inches and radial arm $bx$ a length of 7 inches. Slot 58 had an elongation sufficient to accommodate about 3 inches of displacement of pivot $c$ in the rotation of the bellcrank lever 26 about axis $x$. As depicted by FIGS. 1 and 4, in such an arrangement, leg $bc$ was disposed substantially tangent to the periphery of a 6 inch diametered pivot shaft 20 on which the wheel supports 18 were mounted and permitted cradle 42 to be moved into a nearly horizontal disposition where it was immmediately adjacent to and closely paralleled the hydraulic cylinder 24 or other length-adjustable member (as when the wheels 16 are lowered to their transport position.) The arrangement also permitted leg *bc* to be swung to a second position where it was disposed generally vertical and at right angles to the axis of the wheel support 18 (as when the wheels are rotated to their lowered or working position illustrated by FIG. 4). Thus in both the working and transport positions of the implement wheels, the elevating mechanism assumed relatively stable positions.

Although the yielding connection 48 of the cradle 42 to the implement frame is satisfactorily achieved by the aforedescribed pin in slot connection, FIG. 5 illustrates an alternate embodiment in which remote end 46 of the cradle 42 is pivotally connected at 66 to the upper end of a generally vertical link 68 which in turn is pivotally connected at its opposed end to the implement frame as by pivot pin 70. In this embodiment of the invention, pivot connections 66 and 70 of link 68 to cradle 42 and the implement frame respectively should be spaced apart as great a distance as possible and at least as great as the distance through which the cradle moves in response to retraction and extension of the operating cylinder with the desired result that, between the termini of the arc *g* through which pivot pin 66 swings on pivot 70, its movement is generally horizontal, and only minimally varies from an extension of leg *ab*.

In either embodiment, the connection of the remote end of the cradle to the implement frame 10 therefore yields with each extension and retraction of the hydraulic cylinder so that the reacting forces are confined within the operating mechanism represented by the triangle *abc*. The yielding movement of the connection (60 or 66) of the mechanism to the implement frame generally parallels the direction in which the length-adjustable member 24 extends and retracts while limiting horizontal displacement of the pivotal connection *y* of the cradle to the implement frame. The implement frame height is therefore directly responsive to the rocking of the wheels and their support on axis *x—x*.

From the aforesaid description of two embodiments of the invention it will be appreciated that all the recited objects, advantages and features of the invention have been demonstrated as obtainable in a highly practical manner and structure.

Having described our invention, we claim:

1. In an agricultural implement having a frame, a wheel-supporting arm journalled on the frame for rotation on an axis extending transversely of said frame, and torque means actuatable to swing the wheel supporting arm on said axis and thereby to effectively raise or lower a wheel supported on said arm relative to the implement frame, said torque means comprising a pair of angularly displaced radial arms rigidly fixed to the wheel supporting arm to turn therewith on said axis, a cradle embodying a rigid member having one end pivotally connected to one of said radial arms at a location herein designated *c*, and mounting means pivotally connecting the other end of the cradle rigid member to the implement frame remote from said axis, and a length-adjustable member having one end pivotally connected to the other of said radial arms at a location herein designated *b* and its opposite end pivotally connected to the cradle rigid member at a location herein designated *a* which is spaced from said axis, the spacing of *a* from *c* and *c* from *b* remaining constant as the spacing of *a* from *b* changes in response to extension and retraction of said lengthadjustable member so as to apply torque to the wheel supporting arm through the other of said radial arms, and said mounting means accommodating movement of the cradle rigid member generally lengthwise of the implement frame in response to extension and retraction of the lengthadjustable member, said mounting means limiting displacement of the pivotal connection of the cradle rigid member to the implement frame in directions transversely of said generally lengthwise movement of the cradle rigid member.

2. The torque means of claim 1 wherein the lengthadjustable member comprises a double acting hydraulic cylinder having an extendible and retractable piston member.

3. The combination of claim 1 wherein the wheel supporting arm and radial arms of the torque means are rigidly fixed to a transversely disposed shaft journalled on the implement frame for axial rotation.

4. The torque means of claim 1 wherein said mounting means accommodating movement of the cradle rigid member generally lengthwise of the implement frame embodies a pivot pin and an elongated slot through which the pivot pin extends for pivotally connecting the rigid member of the cradle to the implement frame.

5. The torque means of claim 4 wherein the elongated slot has its longer dimension extending generally toward said axis on which the wheel supporting arm turns.

6. The torque means of claim 5 wherein said longer dimension of the elongated slot extends in a direction generally parallel to the direction in which the lengthadjustable member is adjusted.

7. The torque means of claim 2 wherein the mounting means pivotally connecting the rigid member of the cradle to the implement frame includes a pivot pin extending through an elongated slot and fixed to the implement frame, the longer dimension of the slot being greater than the diameter of said pivot pin and the smaller dimension of said slot being substantially equal to the diameter of said pin.

8. The torque means of claim 1 wherein the means accommodating movement of the rigid cradle member longitudinally of the frame comprises a link extending generally at right angles to the movement, said link being pivotally connected at one end to the rigid member of the cradle and at its opposite end to the frame.

9. The torque means of claim 8 wherein the pivotal connection of the link to the frame is at a substantial distance from the pivotal connection of the link to the cradle rigid member such that movement of its pivotal connection to the cradle rigid member in response to lengthening and shortening of the length adjustable member is substantially horizontal.

10. The torque means of claim 9 wherein the distance between the pivotal connections of the link to the rigid member of the cradle and to the implement frame is at least as great as the extent of movement to which the cradle rigid member is subjected.

11. In an agricultural implement having a generally horizontal frame, a transversely disposed shaft horizontally journalled on the frame for axial rotation, a wheel-supporting arm rigidly fixed to said shaft to turn therewith, and torque means actuatable to turn the shaft on its axis and thereby swing said wheel-supporting arm to effectively raise or lower the implement frame, said torque means comprising an actuating lever rigidly fixed to the shaft intermediate its ends, a fore and aft extending rigid cradle, a first pivot pin pivotally connecting one end of the rigid cradle to a lower portion of the actuating lever at a radial distance spaced from the axis of the shaft, a second pivot pin pivotally connecting the other end of the rigid cradle to the implement frame at a distance remote from said journalled shaft, a hydraulic-actuated cylinder and piston extending lengthwise of said rigid cradle, a third pivot pivotally connecting one end of the hydraulic actuated cylinder and piston to an upper portion of the actuating lever at a point radially spaced from and above the axis of the shaft and at a fixed distance from the first pivot pin which pivotally connects the cradle to said actuating lever, and a fourth pivot pin pivotally connecting the other end of said hydraulic-actuated cylinder and piston to the rigid cradle at a distance from the shaft therebetween and the second pivot pin pivotally connecting the cradle to the implement frame, said hydraulic-actuated cylinder and piston being extendable and retractable so as to change the separation of the third pivot pin from the fourth pivot pin while the separation of the first pivot pin from the third and fourth pivot pins remains unchanged to effectively apply torque to the shaft through the actuating lever, the cradle having a generally horizontally elongated slot through which said second pivot pin extends, so as to accommodate fore and aft movement of the rigid cradle generally lengthwise of the implement frame in response to extension and retraction of the hydraulic cylinder and piston, the width of the slot being only slightly greater than the diameter of the second pivot pin therethrough so as to limit vertical displacement of the pivotal connection of the cradle to the implement frame in the raising and lowering of the implement.

* * * * *